(12) United States Patent
Helmenstein

(10) Patent No.: US 9,333,888 B2
(45) Date of Patent: May 10, 2016

(54) HEATER FAN, ESPECIALLY FOR USE AS A NECK WARMER IN VEHICLE SEATS

(71) Applicant: W.E.T. Automotive Systems AG, Odelzhausen (DE)

(72) Inventor: Winfried Helmenstein, München (DE)

(73) Assignee: GENTHERM GMBH, Odelzhausen (DE)

( * ) Notice: Subject to any disclaimer, the term of this patent is extended or adjusted under 35 U.S.C. 154(b) by 157 days.

(21) Appl. No.: 13/948,543

(22) Filed: Jul. 23, 2013

(65) Prior Publication Data

US 2014/0159442 A1  Jun. 12, 2014

(30) Foreign Application Priority Data

Jul. 25, 2012 (DE) .................. 10 2012 014 679
Dec. 7, 2012 (DE) .................. 10 2012 023 909
Jul. 19, 2013 (DE) .................. 10 2013 012 033

(51) Int. Cl.
*B60N 2/56* (2006.01)
*B60N 2/48* (2006.01)
*F24H 3/04* (2006.01)

(52) U.S. Cl.
CPC ............. *B60N 2/56* (2013.01); *B60N 2/4876* (2013.01); *B60N 2/5671* (2013.01); *F24H 3/0429* (2013.01)

(58) Field of Classification Search
CPC ............................ B60N 2/4876; B60N 2/56
USPC .................. 297/180.14, 180.13, 180.1
See application file for complete search history.

(56) References Cited

U.S. PATENT DOCUMENTS

| | | | |
|---|---|---|---|
| 2,738,593 A * | 3/1956 | Fox | 34/90 |
| 3,101,660 A | 8/1963 | Taylor | |
| 4,092,963 A * | 6/1978 | Vrooman | F02M 31/18 123/549 |
| 5,102,189 A | 4/1992 | Saito et al. | |
| 5,160,517 A | 11/1992 | Hicks et al. | |
| 5,839,774 A | 11/1998 | Hack et al. | |
| 5,927,817 A | 7/1999 | Ekman et al. | |
| 6,059,018 A | 5/2000 | Yoshinori et al. | |
| 6,196,627 B1 | 3/2001 | Faust et al. | |
| 6,321,996 B1 | 11/2001 | Odebrecht et al. | |
| 6,604,785 B2 | 8/2003 | Bargheer et al. | |
| 6,644,735 B2 | 11/2003 | Bargheer et al. | |
| 6,761,399 B2 * | 7/2004 | Bargheer | B60N 2/48 298/180.12 |
| 7,784,863 B2 * | 8/2010 | Fallen | 297/180.14 |
| 7,963,595 B2 * | 6/2011 | Ito et al. | 297/180.14 |
| 8,167,368 B2 | 5/2012 | Eckel | |
| 8,201,203 B2 * | 6/2012 | Vitito | B60N 2/4876 297/180.14 |
| 2008/0036249 A1 * | 2/2008 | Heckmann et al. | 297/180.13 |
| 2009/0134677 A1 * | 5/2009 | Maly | B60N 2/5657 297/180.14 |
| 2011/0101741 A1 * | 5/2011 | Kolich | 297/180.12 |

FOREIGN PATENT DOCUMENTS

| | | |
|---|---|---|
| DE | 19824191 A1 | 12/1998 |
| DE | 19830797 A1 | 1/1999 |
| DE | 19927232 A1 | 12/1999 |

(Continued)

*Primary Examiner* — David R Dunn
*Assistant Examiner* — Jody Giacoman
(74) *Attorney, Agent, or Firm* — The Dobrusin Law Firm, P.C.

(57) ABSTRACT

The present invention concerns a heater fan for a body support arrangement, and specifically the heater fan has at least one air delivery arrangement and at least one heating appliance.

19 Claims, 2 Drawing Sheets

(56) References Cited

FOREIGN PATENT DOCUMENTS

| | | | |
|---|---|---|---|
| DE | 19949935 | C1 | 11/2000 |
| DE | 10047754 | A1 | 4/2002 |
| EP | 0217752 | A2 | 4/1987 |
| EP | 1075984 | B1 | 5/2003 |

* cited by examiner

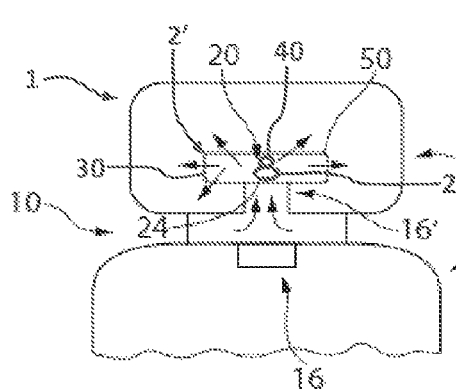
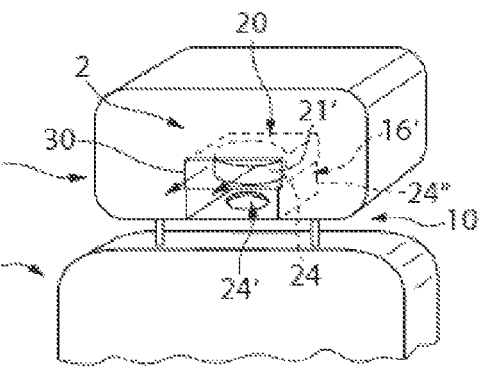
Fig. 4　　　　　Fig. 5
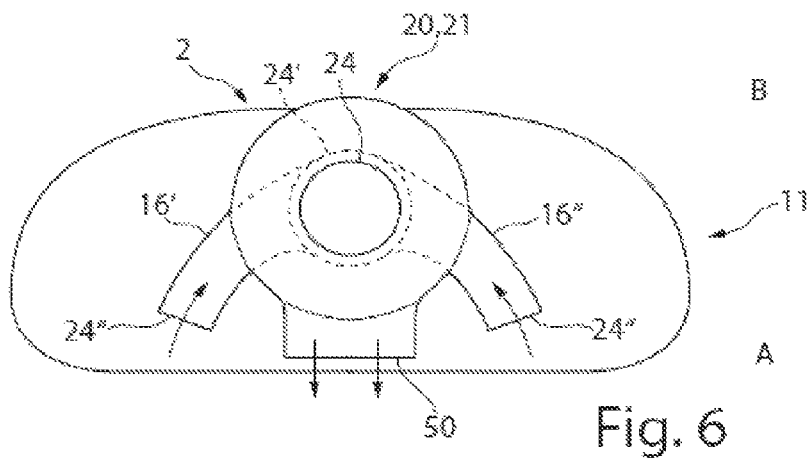
Fig. 6
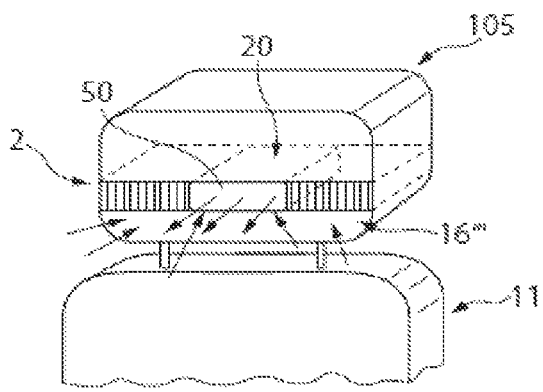
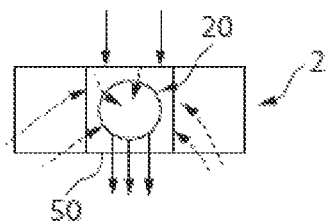
Fig. 7a　　　　　Fig. 7b

HEATER FAN, ESPECIALLY FOR USE AS A NECK WARMER IN VEHICLE SEATS

The present invention concerns a heater fan for a body support arrangement, wherein the heater fan has at least one air delivery arrangement and at least one heating appliance.

Heater fans of this kind are used, e.g., as neck-warmers for air conditioning of vehicle seats and passenger compartments.

Known neck warmers are limited in their functionality or relatively expensive. Thus, there is a demand for economical systems with high efficiency, simple installation, and compact weight-saving design.

SUBJECT MATTER OF THE INVENTION

Against this background, a technical concept is proposed with a heater fan for a body support arrangement, wherein the heater fan has at least one air delivery arrangement and at least one heating appliance. The present teachings provide for a neck warmer with a heater fan of the teachings herein, wherein the air delivery arrangement has a radial fan with at least one intake opening, which is directed toward an intermediate space between a seal back and a head rest.

The present teachings further provide for a set for a vehicle with at least one heater fan of the teachings herein and/or a neck warmer of the teachings herein. The present teachings provide for a vehicle including a heater fan, a neck warmer, a seat, or a combination thereof of the teachings herein. Further advantageous embodiments will be found in the other claims and the following specification.

FIGURES

In what fellows, details of the invention will be discussed. These remarks should make the invention comprehensible. However, they are only in the way of an example. Of course, one or more features as described can also be omitted from, modified, or added to the invention. The features of different embodiments can also be combined with each other, of course. What is critical is that the concept of the invention is essentially implemented. When a feature is to be at least partly fulfilled, this includes the feature also being entirely or essentially entirely fulfilled. "Essentially" means here, in particular, that the implementing enables an achieving of the desired benefit to a recognizable degree. This can mean, in particular, that a corresponding feature is fulfilled by at least 50%, 90%, 95% or 99%.

Figure 1:
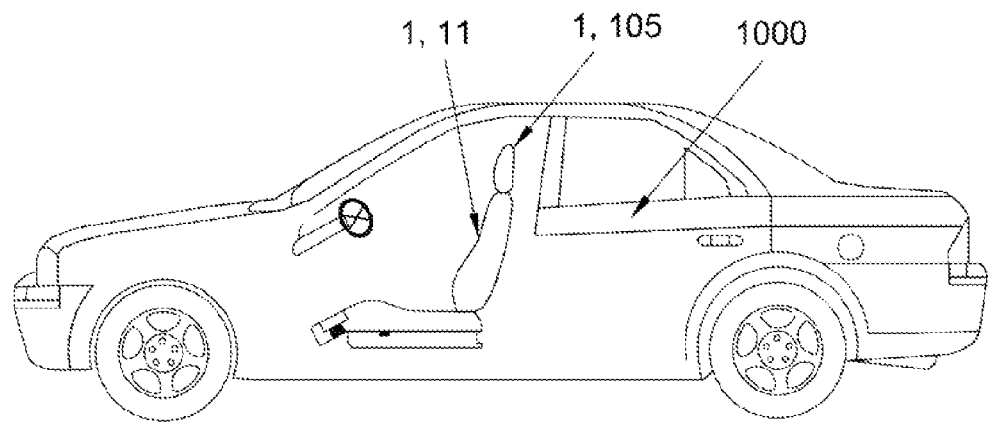

Reference shall be made below to:

FIG. 1 motor vehicle in partial longitudinal section

Figure 2:
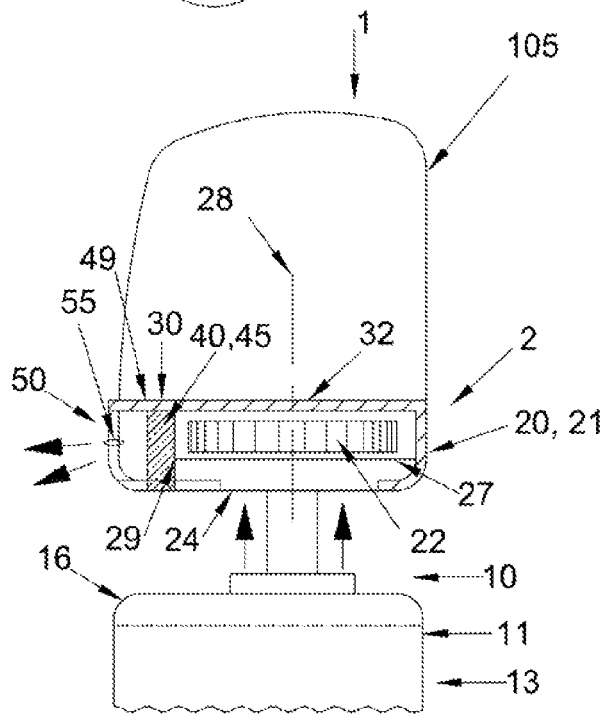
Figure 3:
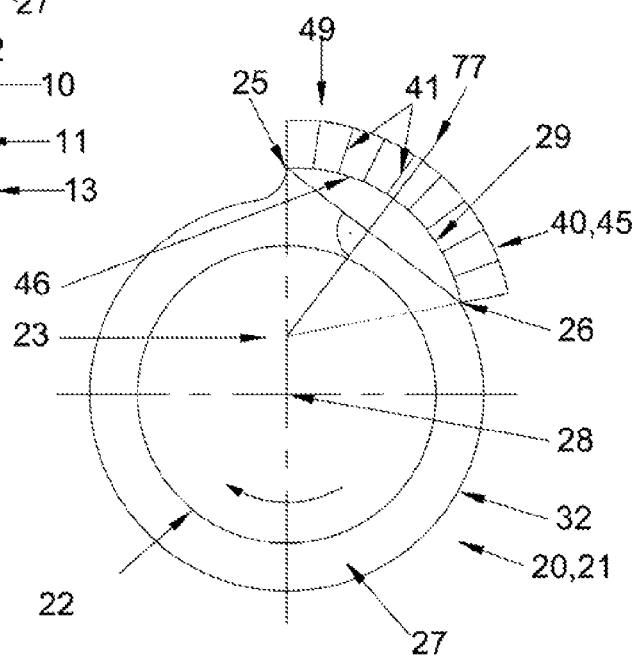

FIG. 2 upper part of the seat of the motor vehicle of FIG. 1 with neck warmer in longitudinal section FIG. 3 top view of a fan of a neck warmer of FIG. 1 a with the housing partly removed FIG. 4 front view of the upper region of the seat of FIG. 1 with a second embodiment of a neck warmer FIG. 5 perspective view of the upper region of the seat of FIG. 1 with a third embodiment of a neck warmer FIG. 6 view of a seat of FIG. 1 from above, not showing the head rest, with a fourth embodiment of a neck warmer FIG. 7a perspective view of the upper region of the seat of FIG. 1 with a fifth embodiment of a neck warmer FIG. 7b top view of the fan mechanism of the embodiment of FIG. 7a

SPECIFICATION OF THE INVENTION

The present teachings claim priority to German Application No. DE102012014679.5 filed on Jul. 25, 2012 and DE102012023909.2, filed on Dec. 7, 2012, both of which are incorporated by reference herein.

FIG. 1 shows a vehicle 1000 as one conceivable area of use of the invention. This can be, e.g., an airplane, a railway vehicle, a ship, or a motor vehicle as in the present case.

The vehicle has at least one body supporting arrangement 1. When in doubt, this means any structural parts that support a user of a passenger compartment, especially seats, seat banks, head rests, arm rests, and the like.

Such a body support arrangement 1 is preferably coordinated with at least one heater fan 2 in the form of a neck warmer 2'. The neck warmer 2' has one or more air delivery arrangements 20. In order to suction air from behind and/or underneath a body support arrangement 1 and eject it toward the user, the one or more air delivery arrangements 20 may include a fan 21'. The fan 21' may be a radial fan 21.

The air delivery arrangement 20, as shown in FIG. 2, can be arranged beneath a head rest 105 or in a seat back 11. But it can also be arranged on the B-side of the cushion 13 facing away from the user, in order to achieve a good vibration attenuation. Depending en the application, it may also be expedient to integrate it in a cushion 13.

The heater fan 2 has at least one air delivery arrangement 20 and at least one heating appliance 40. Preferably, the air delivery arrangement 20 has a housing 30, which surrounds an impeller 22 and a heating appliance 40. Preferably the housing 30 of the air delivery arrangement 20 is made at least partly of an elastic material, such as silicone, rubber, or the like. This dampens vibrations and prevents injuries from unintentional or careless rapid head movements of a user.

The air delivery arrangement 20 can have an intake opening 24. Preferably, however, the intake opening 24 of the air delivery arrangement 20 is free of struts, in order to minimize air resistance. Furthermore, the intake opening preferably lies on an axis of rotation 28 of an impeller 22 or has the axis passing through it. For it is advisable for the air to be drawn in parallel to or along the axis of rotation into the radial fan. In the case of a radial fan mounted underneath a head rest 105 with air ejected in the direction of the user, the intake opening 24 is preferably oriented downward to the seat back 11 and an intermediate space 10. In this way, air is suctioned from the intermediate space 10 between seat back 11 and head rest 105.

Since head rests are usually adjustable, it can be advisable to limit the amount of lowering of the head rest 105 to the seat back 11, so as to ensure a minimum gap for the intermediate space 10 between the two components 11, 105.

In addition or alternatively, a supply duct 18 in the form of a channel-like recess at the upper edge of the seat back 11 can also be provided. Its position corresponds to the intake opening 24 of the air delivery arrangement 20. The recess 16 is preferably elongated, in order to ensure an air supply to the intake opening 24 even when the head rest 105 is lowered to its bottom position, and thus the intake opening 24 of the air delivery arrangement 20 is actually closed. Preferably, the recess 10 extends to the front side and/or the back side of the seat back 11. But this recess 18 can also be closed off in front toward the user, in order to force a supply of fresh air from the back side of the seat back 11. It can also alternatively be closed off in the back, to force a circulation of the air delivery. This increases the heating efficiency of the neck warmer 2'.

If an air delivery arrangement 20 is arranged additionally or alternatively on the upper edge of the seat back 11, its intake opening 24 will preferably be oriented toward the head rest 105 or upward. The described operating principles for a corresponding elongated recess in the head rest will remain the same.

The intake opening 24 is preferably flush with or concentric to the impeller and staggered on the axis of rotation of the impeller 22 of the radial fan.

The air delivery arrangement 20, as shown in FIG. 3, has at least one impeller 22 in a worm-shaped working space 27, which takes in air from an intake opening 24 in the housing, which deflects the airflow by preferably around 90° and then puts out the air flow through a heating appliance 40 and one or more blowing vents 50.

In a typical radial fan or heater fan, air is ducted along a tangent from a fan and an outlet opening of the working space is perpendicular to this tangent to the impeller.

In the preferred air delivery arrangement 20 of the invention, this tangential bundling of the air stream is omitted. Instead, the housing 32 of the working space 27 of the impeller 22 is opened along a segment of a circumference so that air can emerge in the radial direction (with respect to the axis of rotation 28 of the impeller 22) from the working 27. Thus, the outflow opening 29 of the working space is at a position at least partly displaced inward as compared to conventional radial fans. The outflow opening 29 of the working space 27 is thus free of struts or the typical outflow strut is replaced by the heating appliance 40 and its housing. This provides a compact design with very slight flow and heat losses.

The air delivery arrangement 20 preferably has at least one heating appliance 40, e.g., in the form of an ohmic resistance. The heating appliance 40 preferably has a plurality of heat input elements 41. These heat input elements can be, for example:
- a plurality of individual sheetlike elements which transfer heat from a heat source to a fluid stream, e.g., heat conducting baffles as in FIG. 2,
- a section of a zig zag bent strip that channels or generates heat,
- a plurality of heating circuits or a plurality of sections of a single healing circuit which generate heat directly,
- a plurality of varies which convey and/or generate heat and at the same time guide the fluid stream,
- a register of heating coils,
- a PCT heating element with or without heat exchanger, and/or
- one or more Peltier elements.

These heat input elements 41 are preferably at least partly grouped into a register block. The register block or the heating appliances are at least in part not perpendicular but instead parallel or inclined to the direction of flow of the fluid stream impinging on them. Preferably, at least some of the heat input elements 41 deflect the fluid stream emerging from the impeller 22.

Preferably, the register block or the heating appliance acts as a diffuser 45, which broadens out the fluid stream flowing through it from an inlet width to a larger outlet width in funnel fashion, i.e., fanning it out. The heat input elements 41 of the heating appliance 40 are preferably arranged in an arc along the outflow opening 29 of the working space 27, so that the outer edge 49 of the heating appliance 40 corresponds to the width of the blowing vent 50 of the air delivery arrangement 20 or that of a diaphragm 55 of the neck warmer 2'. That is, the edge 49 of the heating appliance has at least roughly the same length as the blowing vent of the air delivery arrangement 20 or the air emerging from a smaller heating appliance 40 is distributed without further significant deflection across the full width of a larger blowing vent 50 of the air delivery arrangement 20. It can also be provided that the edge 40 of the heating appliance is identical to the blowing vent 50 of the air delivery arrangement 20.

Preferably, the aforementioned arc for the arrangement of the heat conducting elements corresponds to a circle segment 48. The corresponding circle preferably encompasses both edges of the outflow opening 29 of the working space 27. The center point 23 of this circle preferably lies on the straight line connecting the front edge 25 of the outflow opening of the working space in the flow direction and the axis of rotation 28 of the impeller. Furthermore, the center point 23 preferably lies on a perpendicular 77 at the center point of the line connecting the two edges 25, 26 of the outflow opening 29 of the working space 27. This arrangement has the effect that the air flowing through it ensures an optimal heat exchange, and the outflowing air is distributed optimally over the cross section of the outflow opening of the air delivery arrangement on a head rest.

The housing 30 of the air delivery arrangement 20 has at least one blowing vent 50, which in regard to the axis of rotation 28 of the impeller 22 lies at least in part at the same height as this impeller 22. Preferably the arrangement is such that the air stream elected by the impeller 22 can pass through without having to change its direction of flow, at least without a change in the lengthwise direction of the axis of rotation.

Preferably, at least one blowing vent 50 is covered by a diaphragm 55, e.g., by a lattice with swiveling blades. This prevents a contact between heating appliance 40 and impeller 22, on the one hand, and user on the other. Furthermore, the air can be directed as the user desires and adjusted to their body height.

in the design specified here, the radial fan is thus arranged so that its natural intake and its natural outflow is congruent to the desired operation of the neck warmer and so no deflection of the air is needed. This enables an optimal utilization of the energy input for operation. If its blades are curved backward in terms of its direction of rotation, the fan operates more quietly and with less vibration.

A heater fan 2 according to the invention, especially in an embodiment according to FIG. 3, can also be used for alternative applications and be arranged lower down in the seat, e.g., to warm the lower back. A use on vehicle doors, in the foot area, or on a dashboard, or also on beds, garden furniture and the like, is also conceivable.

FIGS. 4 to 7b show variants of this concept. They make use of the same principles. Therefore, only the differences shall be mentioned below. In particular, however, they can all be configured as described in regard to the heating element.

The embodiment according to FIG. 4 shows that in addition to or alternatively to the supply duct 16 in the seat back 11 there can also be provided a supply duct 16' in the head rest 105. This preferably runs as a recess along the underside of the head rest 105 and beneath the air delivery arrangement 20. The principles described for the supply duct 18 apply to its arrangement, orientation and shape.

According to FIG. 5, the air delivery arrangement 20 and the supply duct 16' can also be designed as a common structural part, e.g., a plastic molded part with two parallel shafts having a rectangular cross section. The air delivery arrangement 20 here is situated on an upper level, in which the impeller of the air delivery arrangement 20 expels the air forward through a heating element toward the neck of the user The downward directed intake opening 24 of the fan 21' is connected to the supply duct 16'and is replenished with air from it. If the head rest 105 is at a distance from the seat back, the supply ducts 16' will be supplied with air via the now opened air vent opening 24'. The air vent opening 24' is arranged preferably flush with the intake opening 24 of the fan 21', preferably concentric to the axis of rotation of the impeller of the fan 21'. Its area is preferably larger than the area of the intake opening 24 of the fan 21'. In addition, at least one second air vent opening 24" is provided in the supply duct 16', which also ensures the replenishment of air when the head rest 105 is retracted fully onto the seat back. This second air vent opening 24" is preferably arranged on the back side of the head rest 105 away from the user and is subjected to eddy currents from the driving wind, for example. Alternatively or in addition to the second air vent opening 24", an air vent opening can also be provided on the front side of the head rest 105 facing the user. This then lies at the end face of the supply duct 16' beneath the blowing vent 50.

The embodiment of FIG. 6 largely corresponds to that of FIG. 5. Here as well a fan 21' is provided with a downwardly directed intake opening 24, which draws air from a supply duct 16' situated on a lower level. The supply duct 16' also has a first air vent opening 24' similarly to FIG. 5. The supply duct 16", however, does not run from front to rear perpendicular to the surface of the seat back. Instead, it is U-shaped, its middle piece being connected to the fan 21'. Its legs are curved forward toward the user and draw in air at two air vent openings 24" symmetrically on right and left at the side of the user and the blowing vent 50, which is then taken to the fan. In this way, one gets a circulation of the heated air that is blown out, which improves the energy efficiency of the system. Preferably, the air vent openings 24" are situated in a region in which an increased back pressure would arise without the air vent openings 24" at adjoining areas of the seat back or the head rest.

The circulation effect can be further intensified if the supply duct 16" is provided with one or more air vent openings 24" essentially over the entire width of the seat back as in FIGS. 7a and b, which together cover at least half the width of the seat back, preferably essentially the entire width of the seat back. It may also be expedient for this if the supply duct 16' and its air vent openings 24" form essentially a lowermost level of a head rest. Preferably, in addition, the areas next to the blowing vent 80 are further designed as an air vent opening 24". To further improve the air supply, in addition or alternatively air vent openings can also he provided in the rear toward the back side of the seat.

Preferably the air delivery arrangement 20 with the supply duct are jointly configured as a modular component. It can be provided on its visible areas with an upholstery that preferably matches that of the seat back or the head rest.

LIST OF REFERENCES 1 body support arrangement
2 heater fan
2' neck warmer
10 intermediate space
11 seat back
13 cushion
16 supply duct as recess in the seat back
16' supply duct as recess in the head rest
16" supply duct as air duct in the head rest
20 air delivery arrangement
21 radial fan
21' fan
22 impeller
23 center point of the circle
24 intake opening
24' first air vent opening
24" second air vent opening
25, 26 edge of outflow opening
27 working space
28 axis of rotation
29 outflow opening
30 housing of the air delivery arrangement
32 housing of the working space
40 heating appliance
41 heat input, elements
45 diffuser
48 circle segment
49 edge of the heating appliance
50 blowing vent
55 diaphragm
77 perpendicular
105 head rest
1000 vehicle

The invention claimed is:

1. A body support comprising:
   i. a seat back;
   ii. a headrest; and
   iii. a neck warmer comprising an air delivery arrangement including:
      a) an intake opening directed toward an intermediate space located between the seat back and the headrest;
      b) a fan drawing in air from the intermediate space through the intake opening, and
      c) a vent opening directed toward a user in the body support,
   wherein the intake opening is arranged generally perpendicular to the vent opening, and
   wherein the seat back includes an upper edge facing a lower edge of the headrest, the upper edge includes a recess that generally corresponds to the intake opening so that the fan can draw in air from the intermediate space even when the headrest is lowered against the upper edge of the seat back.

2. The body support according to claim 1, wherein the fan has an impeller with an axis of rotation along which and/or parallel to which the air is drawn into the fan.

3. The body support according to claim 2, wherein the axis of rotation passes through the intake opening.

4. The body support according to claim 1, wherein the body support is a seat for a vehicle.

5. The body support according to claim 1, wherein the vent opening is located in a front side of the headrest so that the fan can blow the drawn-in air towards the user.

6. The body support according to claim 5, wherein the vent opening is covered by a diaphragm so that contact between the user and a heating appliance is prevented.

7. The body support according to claim 1, wherein the recess extends to a front side of the seat back facing the user.

8. The body support according to claim 1, wherein the fan is a radial fan.

9. The body support according to claim 1, wherein the air delivery arrangement includes a housing that is made at least partially of an elastic material so that vibrations from the fan are at least partially dampened by the housing.

10. The body support according to claim 1, wherein the intake opening is free of struts so that air resistance is minimized.

11. The body support according to claim 1, wherein the air delivery arrangement includes at least one heating appliance deflecting the drawn-in air from the intermediate space, the at least one heating appliance comprises one or more heat input elements that include one or more:
   i. heat conducting baffles;
   ii. zig zag bent strips that channel or generate heat;

iii. heating circuits that generate heat directly;
iv. register of heating coils;
v. PCT elements with or without a heat exchanger;
vi. Peltier elements.

12. An assembly, comprising:
a neck warmer, comprising an air delivery arrangement including:
   a) an intake opening directed toward an intermediate space located between a seat back and a head rest;
   b) a fan drawing in air through the intake opening from the intermediate space, and
   c) a vent located in the head rest and directed toward a user so that the fan can blow the drawn-in air towards the user,
wherein the seat back includes an upper edge having a recess that generally corresponds to the intake opening so that the fan can draw in air from the intermediate space even when the head rest is lowered against the upper edge of the seat back.

13. The assembly according to claim 12, wherein the recess extends to a front side of the seat back towards the user.

14. The assembly according to claim 12, wherein the air delivery arrangement includes a heating appliance arranged parallel or inclined to a direction of flow the drawn-in air, the heating appliance comprises one or more heat input elements that include one or more:
   i. heat conducting baffles;
   ii. zig zag bent strips that channel or generate heat;
   iii. heating circuits that generate heat directly;
   iv. register of heating coils
   v. PCT elements with or without a heat exchanger;
   vi. Peltier elements.

15. The assembly according to claim 12, wherein the intake opening is arranged generally perpendicular to the vent.

16. A vehicle seat, comprising:
i. a seat back;
ii. a head rest; and
iii. a neck warmer comprising an air delivery arrangement including:
   a) an intake opening directed toward an intermediate space located between the seat back and the head rest;
   b) a fan drawing in air through the intake opening from the intermediate space, and
   c) a vent opening located in the head rest and directed toward a user in the vehicle seat so that the fan can blow the drawn-in air past a heating appliance towards the user,
wherein the seat back includes an upper edge that faces a lower edge of the head rest, the upper edge includes a recess that generally corresponds to the intake opening so that the fan can draw in air from the intermediate space even when the head rest is lowered to a bottom position so that the lower edge of the head rest is against the upper edge of the seat back.

17. The vehicle seat according to claim 16, wherein the recess extends to a front side of the seat back towards the user.

18. The vehicle seat according to claim 16, wherein the intake opening is arranged generally perpendicular to the vent opening.

19. The vehicle seat according to claim 16, wherein the air delivery arrangement includes a heating appliance that comprises one or more heat input elements that include one or more:
   i. heat conducting baffles;
   ii. zig zag bent strips that channel or generate heat;
   iii. heating circuits that generate heat directly;
   iv. register of heating coils
   v. PCT elements with or without a heat exchanger;
   vi. Peltier elements.

* * * * *